AUTOMATIC TELEPHONE REPERTORY DIALING SYSTEM

Filed March 28, 1961 2 Sheets-Sheet 1

INVENTOR.
RICHARD K. WALKER
BY George H. Fritzinger
AGENT

July 27, 1965 R. K. WALKER 3,197,572

AUTOMATIC TELEPHONE REPERTORY DIALING SYSTEM

Filed March 28, 1961 2 Sheets-Sheet 2

INVENTOR.
RICHARD K. WALKER

BY George H. Fritzinger

AGENT

United States Patent Office 3,197,572 Patented July 27, 1965

3,197,572

AUTOMATIC TELEPHONE REPERTORY DIALING SYSTEM

Richard K. Walker, Convent, N.J., assignor, by mesne assignments, to DASA Corporation, Andover, Mass., a corporation of California Filed Mar. 28, 1961, Ser. No. 98,962
16 Claims. (Cl. 179—90)

This invention relates to repertory dialing apparatus for recording subscribers' telephone numbers in code form and for reproducing the recorded numbers to make selected calling connections. More particularly, the invention relates to such apparatus of the character described in the pending Kobler et al. application Serial No. 784,258, now Patent No. 3,040,133 dated June 19, 1962, filed December 31, 1958, wherein invidual letters and digits of telephone numbers are recorded as continuous signal bands of time durations depending upon the lengths of the pulse trains fed out from the telephone dialing mechanism and wherein during reproducing these continuous signal bands are converted into pulse trains and fed into the telephone line to make switching connections.

In standard telephone equipment, the digit "1" is represented by a single pulse, the digit "2" and letters "ABC" by two pulses, the digit "3" and letters "DEF" by three pulses, etc. The normal periodicity of the pulses is at a rate of 10 pulses per second and the normal duration of each pulse is 60 milliseconds. The pulses are created by repeated break-make operation of a normally closed pulsing switch in the telephone circuit. Because of mechanical imperfections in standard telephone dial mechanisms due to wear and change in friction and spring tensions, the periodicity of the pulses varies considerably with resultant like variation in the duration of the recorded time bands. For example, the accepted tolerances on the periodicity is plus and minus 10 percent which means that the periodicity of a slow dial would be nine pulses per second and that of a fast dial eleven pulses per second. When pulses having such widely variable periodicity are recorded in code form as continuous signal bands and later reproduced and converted back into dial pulses other sources of error are introduced in the recording and reproducing apparatus making it necessary to control the tolerances on the source of the original pulses to closer limits. This has required the use of special dial mechanisms of more expensive construction built to closer tolerances.

An object of the present invention is to provide an automatic repertory dialing machine of the aforementioned type which can be operated satisfactorily during recording from a standard dial mechanism of a telephone line thereby eliminating the need for a separate and more expensive dial mechanism.

Another object of the invention is to provide a recording apparatus which is adapted to record substantially continuous signal bands of time durations depending only upon the number of dial pulses in a given train notwithstanding wide variations in the periodicity of the pulses.

Another object is to provide such recording apparatus which will tolerate variations in the periodicity of the input pulses from dialing mechanisms even exceeding the maximum tolerance limitations prescribed by accepted specifications for telephone equipment.

A still further object is to provide a recording apparatus having a stepping drive mechanism activatable by pulses from a dial mechanism to produce respective impulse movements between the recording head and record medium, each of a definite length, whereby substantially continuous signal bands are recorded depending only on the number of input pulses in a given train.

Another object is to provide such recording apparatus which is selectively shiftable into a reproducing condition to convert the recorded digit-representing time bands into respective pulse trains wherein the pulses have a precise periodicity and a precise duration.

Another object is to provide such recording apparatus which is readily shiftable into a reproducing condition with conversion of the step drive to continuous operation.

These and other objects and features of the invention will be apparent from the following description and the appended claims.

In the description of the invention reference is had to the accompanying drawings, of which:

Figures 1, 2:
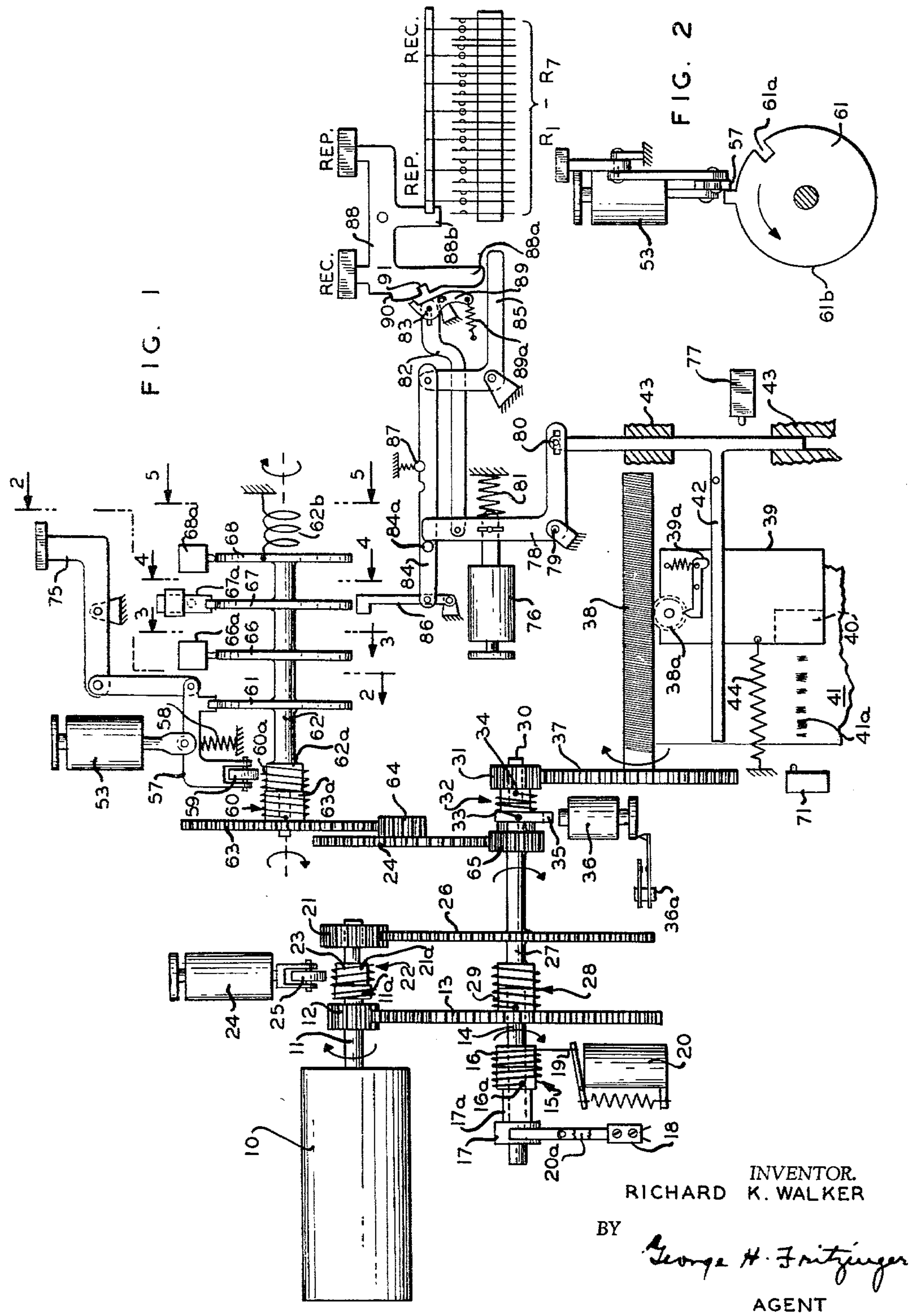
FIGURE 1 is a diagrammatic layout of apparatus according to the invention showing a record-reproduce mechanism with pulse generating means activatable during the reproducing operation.
FIGURE 2 is a fractional view of this apparatus taken on the line 2—2 of FIGURE 1 showing the advance clutch latching cam and related mechanism.

As described in the Kobler et al. application aforementioned, dial pulse signals from telephone dial mechanisms have heretofore been recorded in terms of continuous signal bands of durations bearing a predetermined relation to the number of the input pulses in each pulse train, and these signal bands have been reproduced at the same speed as during recording and at the same time a pulsing switch is cam driven at a precise speed of ten pulses per second through a one-revolution integrating clutch controlled by the signals picked up from the record.

The present invention resides in recording the continuous signal bands in steps at an accelerated speed but for correspondingly shorter time duration so that the length of signal band recorded on the record per input pulse is the same as when the recording is continuous and the dial pulses had a precise rate. This procedure is carried out by a drive mechanism for advancing the recording head relative to the record medium which comprises a one-revolution integrating clutch controlled by the input pulses from the dial mechanism in such manner that the clutch is engaged by the leading portion of each input pulse and completes one revolution of movement at the accelerated speed to advance the recording head by a normal distance before a succeeding input pulse arrives even from a fast dial mechanism. In this way a signal band is recorded of an overall length dependent only on the number of input pulses in a given train notwithstanding wide variations in the rate of the pulses. For example, for dial pulses having a prescribed periodicity of ten per second with an accepted tolerance of plus or minus ten percent, the time intervals between successive pulses of a fast dial is 90.9 milliseconds and of a slow dial 111 milliseconds. Since the duration of a pulse of normal periodicity is permissibly from 60 to 64 milliseconds and would be therefore approximately 70.4 milliseconds as a maximum for a slow dial the present invention requires that each step movement of the recorder head responsive to an input pulse shall be completed in not less than 70.4 milliseconds and in not more than 90.9 milliseconds as theoretical limits. As a compromise I preferably drive the translating head during each step movement at a speed which would correspond to 12 pulses per second were the speed continuous but for a duration of only 83.3 milliseconds (1/12 second) to produce a so-called unit movement of the recorder head. Thus, a length of signal band is put on the record responsive to each input pulse which is the same as were the head driven at a speed corresponding to 10 pulses per second and the speed were continuous for 100 milliseconds duration responsive to each input pulse. When the present machine is shifted into a reproducing condition the drive mechanism is conditioned to feed the reproducing head at a fixed continuous speed corresponding to a rate of 10 pulses per second.

With reference to FIGURES 1 through 5, the present machine comprises a constant speed motor 10 having a drive shaft 11 with a pinion gear 12 meshing with a driven gear 13 to rotate a shaft 14 at a precise speed of ten revolutions per second. On the end of the shaft 14 is a one-revolution clutch 15 with a clutch spring 16 for driving a cam 17 to operate a pulsing switch 18. The clutch spring is secured at **16*a* to the shaft 17*a* of the cam 17 and is connected to a single toothed dog 19 at its other end journaled on the shaft 14. A solenoid 20 normally latches the dog to hold the clutch disengaged. Upon the solenoid 20 being momentarily activated for as little as 20 milliseconds the dog is released to cause the clutch to be engaged for one revolution. If the dog is released for 120 milliseconds it allows the clutch to be engaged for two revolutions, etc. During recording the solenoid 20 is not energized and the clutch 15** remains disengaged.

Further, on the shaft 11 is a journaled pinion gear 21 connectable to the shaft by a spring band clutch 22. This band clutch comprises a helical spring 23 secured to the hub **21*a* of the gear 21 and having an end portion enveloping with suitable clearance an adjacent collar portion 11*a* of the shaft 11 so that the clutch stands normally disengaged. Upon activating a solenoid 24 a roller 25 is pressed onto the outer end portion of the clutch spring 23 to bring it into frictional engagement with the collar 11*a* and in response to the resisting drive force of the gear 21 the spring 23 immediately binds onto the collar 11*a* and clutches the gear 21 to the shaft 11**.

The gear 21 meshes with a driven gear 26 on a shaft 27 mounted in coaxial alignment with the shaft 14 of the gear 13. The pinion gear 21 is slightly larger in diameter than the gear 12 so that the shaft 27 is driven at a precise speed of 12 revolutions per second. A one-way clutch 28 between the shaft 27 and shaft 14 comprises a helical spring 29 embracing axially-aligned equal-diameter portions of these shafts. The helical spring 29 is wound in such direction that when the shaft 27 is driven at the faster speed, which is the case when the clutch 22 is engaged, the frictional contact of the shafts with the spring tends to unwind the same and allow the shaft 27 to rotate at the greater speed; however, the instant the band clutch 22 is disengaged the resising drive force of the shaft 27 on the spring causes the spring to clutch tightly onto the shafts 14 and 27 causing the shaft 27 to be driven in unison with the shaft 14, at a speed of 10 revolutions per second.

The shaft 27 is extended beyond the other side of the gear 26 and is connectable to a shaft 30 of a pinion gear 31 through a one-revolution drive clutch 32. The clutch 32 comprises a helical spring 33 on axially-aligned equal-diameter portions of the shafts 27 and 30. One end 34 of this helical clutch spring is connected to the shaft 30 and the other end is connected to a dog 35 rotatable on the shaft 27. A solenoid 36 referred to herein as the drive trip clutch solenoid serves when energized to move its armature into a blocking relationship with the dog 35 and hold the dog from turning. Rotation of the shaft 27 while the dog 35 is so held tends through frictional contact of the shaft 27 with the spring to unwind the latter and open it sufficiently to permit the shaft 27 to be driven freely. However, the instant the dog 35 is released by deenergization of the solenoid 36 the clutch spring grips the shaft 27 by its natural resilience and in response to the resisting drive force of the shaft 30 is tightened onto the shaft 27 to connect the shaft 30 thereto.

The gear 31 meshes with a gear 37 to drive a lead screw 38. Meshing with the lead screw is a circular feed nut **38*a* journaled on a carriage 39 and held normally latched by a pawl 39*a*. The carriage carries a record-reproduce translating head 40, preferably of the magnetic type having pole tips slidably engaging a magnetic record medium 41. The magnetic record medium is shiftable, by means not herein necessary to show, into successive positions to enable the head to engage respective successive parallel tracks 41*a* thereon. By means of a trip rod 42 slidably mounted at 43 the pawl 39*a* can be disengaged from the circular feed nut to cause then the carriage to be snapped back to home position responsive to a return spring 44. The trip rod 42 is controlled by a reset solenoid 76 via a lever 78 pivoted at 79 and connected at 80 to the trip rod as shown in FIGURE 1. The lever 78 is biased by a spring 81 to disengage the feed pawl 39*a*, but when the machine is in record or reproduce condition the reset solenoid 76 is energized from the D.C. power leads 47 and 52 and through the advance clutch cam switch 67*a* and the carriage end switch 77 (FIGURE 6) to hold the trip rod 42 disengaged from the pawl 39*a***.

As so far described it will be apparent that when the drive clutch solenoid 36 is energized, the carriage is at standstill and that when the solenoid 36 is deactivated for an instant as small as only about 15 milliseconds it will release the dog 35 and cause the shaft 30 to be driven one full revolution within a period of 83.3 milliseconds to advance the head 40 by one unit. As will appear, the solenoid 36 is controlled by input dial pulses from the telephone dial mechanism. Since the dial pulse switch of a telephone is normally closed and is opened for an interval of about 60 milliseconds responsive to each dial pulse, the solenoid 36 is normally energized to hold the clutch 32 normally disengaged and is deactivated to engage the clutch 32 for an interval of 60 milliseconds responsive to each pulse. Since each such 60 millisecond interval is substantially shorter than the 83.3 millisecond interval required for the dog 35 to complete one revolution, the solenoid 36 is returned into a blocking position before completion of the one revolution of movement and stands ready to disengage the drive clutch at the completion of each such revolution. If there is a train of input dial pulses, the drive clutch 32 will be disengaged momentarily only for the instant running from 83.3 milliseconds after the start of the last preceding input pulse to the start of the next succeeding pulse. Thus, step movement of definite length are imparted to the recording head 40 responsive to the respective input dial pulses from the telephone dial mechanism.

The machine is shifted into record condition by throwing the R—R (record-reproduce) bank of switches (FIGURE 6) of which there are seven labeled respectively from $R_1$ to $R_7$, into their number "1" positions. This is done by pressing a "record" button of an R—R rocker 88 having an arm **88*b* which actuates the switches when the button is depressed (FIGURE 1). As soon as the rocker 88 reaches its record position it is latched by a pawl 89 engaging a catch 90 on the rocker responsive to a spring 89*a* connected to the pawl. As the R—R switches are so moved to record position, the $R_1$ switch closes the A.C. power line to the motor 10 and activates the drive trip solenoid 36 through the rectifier 46, plus lead 47, lead 48, switch $R_4$, lead 49 to the telephone station S, hook-switch $H_3$ in the number 2 (hang-up) position, dial pulse contacts 50 of the telephone station, switch $H_2$ in the hang-up position, lead 51 to the repertory dialer cam switch 68*a*** of an advance clutch mechanism, solenoid 36 and negative lead 52 back to the rectifier 46. Activation of the drive trip solenoid 36 disengages the clutch 32 as before described and closes a switch 36a to activate an advance clutch solenoid 53 via the same circuit as for the drive trip solenoid 36 except that from the cam switch 68a the connection is made to the negative lead 52 through the switch 36a, lead 54, machine operated switch 20a, advance clutch solenoid 53 and lead 56. When the advance clutch solenoid 53 is energized it presses a rocker arm 57 (FIGURE 1) down at its center against a return spring 58 to cause a roller 59 journaled at one end of the rocker to bear against a coil spring 60a of a band clutch 60 and to cause the other end of the rocker to bear slidably against a rotary latch cam 61. This cam is secured to a shaft 62 coupled through the advance clutch 60 to a hub of a gear 63 itself coupled through a step gear 64 to a pinion gear 65 on the shaft 27. The coil spring 60a of the band clutch 60 is secured to a hub 63a of the gear 63 and is normally free at its outer end of a smaller coaxial collar 62a of the shaft 62. When the solenoid 53 is energized it causes the roller 59 to press the outer free end of the clutch spring 60a into locking engagement with the hub 62a. Thus, the instant the machine is shifted into record condition the drive trip solenoid 36 is energized disengaging clutch 32 and causing the head carriage to remain at home position but the advance clutch solenoid 53 is energized to engage the advance clutch 60 and start rotating the cam 61. The gears 63–65 between the shaft 27 and the advance clutch cam 61 have a 24 to 1 ratio to cause the shaft 62 to be turned at a rate of one-half revolution per second.

Figures 3, 4, 5, 6:
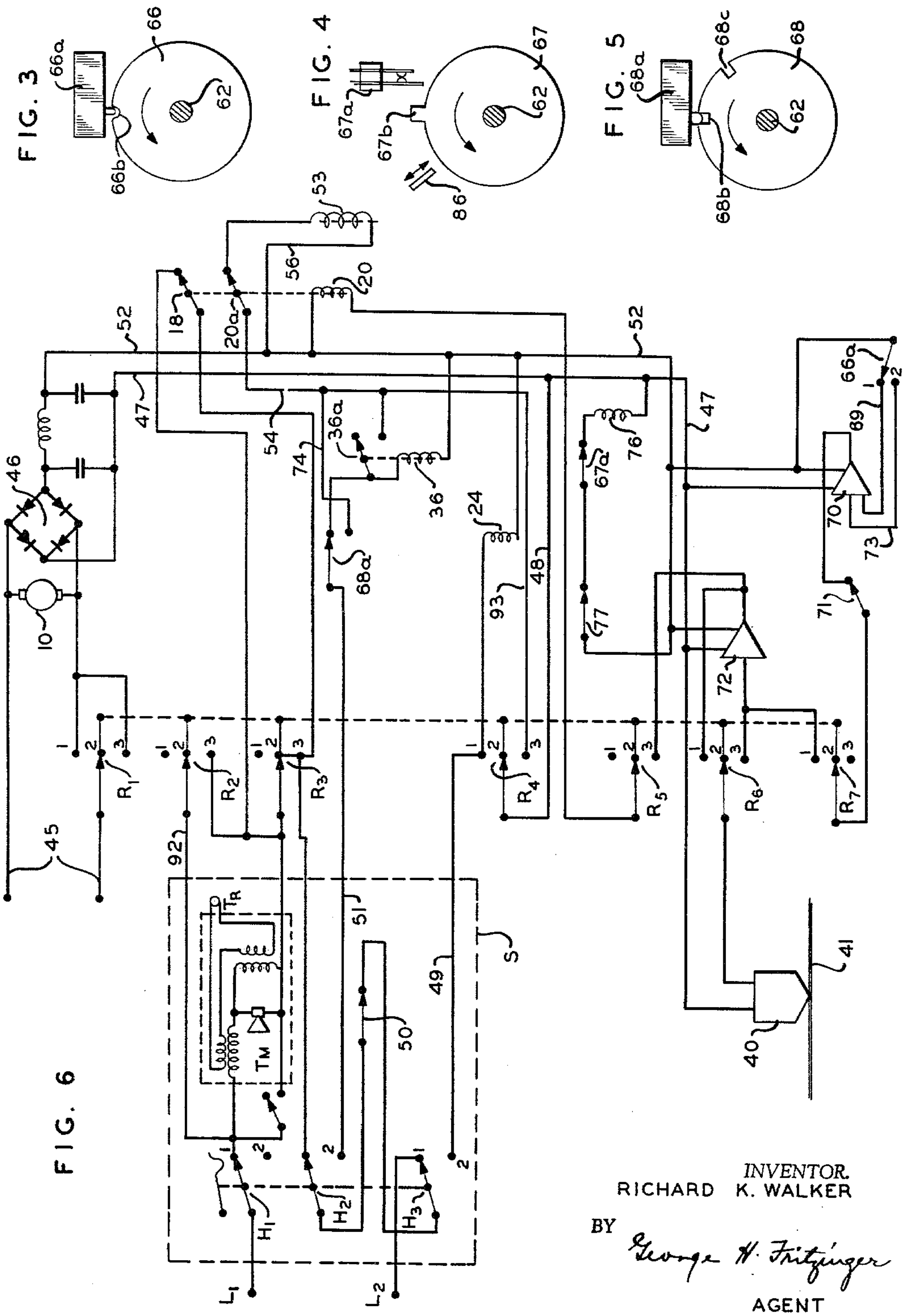
FIGURE 3 is a fractional view taken on the line 3—3 of FIGURE 1 and showing the advance clutch erase-record signal control apparatus.
FIGURE 4 is a fractional view taken on the line 4—4 of FIGURE 1 showing the advance clutch cam and related mechanism employed in the reset and reproduce operations of the machine.
FIGURE 5 is a fractional view taken on the line 5—5 of FIGURE 1 showing the advance clutch cam switch mechanism involved in controlling the advance clutch solenoid and the drive stepping mechanism.
FIGURE 6 is a schematic circuit diagram of the present machine.

On the advance clutch shaft 62 are additional cams 66, 67 and 68 controlling respective switches 66a, 67a and 68a, the switch 68a having been heretofore described. During the first 40 milliseconds of driven movement of the cam 66 the switch 66a is left in an unoperated position by reason of a notch 66b on the cam 66 as shown in FIGURE 3. In this unoperated position of the switch 66a the same connects a record-frequency control lead 69 of an oscillator 70 to ground to cause the oscillator to feed out a record signal. The output circuit leads through a mute switch 71 and switch $R_7$ to the input of an amplifier 72. Although the switch $R_7$ is now closed, the mute switch is held open by the head carriage during its first 40 milliseconds of travel from home position to prevent any initial feed of record signal to the amplifier. The output of the amplifier is connected through the switch $R_6$ to the magnetic record head 40 but no signal is recorded on the record because there is no input signal in the first instance as above-described and, moreover, the drive clutch 32 is in the first instance left disengaged also as before-described.

At the expiration of the first 40 millisecond interval following the shifting of the machine into record condition, several operations occur simultaneously: (1) the switch 66a is operated to connect an erase-frequency control lead 73 of the oscillator 70 to ground, (2) the mute switch 71 is closed to start feeding erase signal to the magnetic head 40 through the amplifier 72, and (3) the cam 68 operates—which is preferably of the snap type—to de-energize the drive trip solenoid 36 and start the forward drive of the head carriage and to maintain energization of the advance clutch solenoid 53 via a lead 74.

The head carriage continues to be driven forwardly without interruption during the next one quarter second with erase signal being fed to the magnetic head 40. At the end of this one-quarter second interval two operations take place: (1) the rocker 57 drops into engagement with a notch 61a on the latching cam 61 of the advance clutch mechanism latching the cam and causing the advance clutch 60 to become disengaged by reason of the removal of pressure of the roller 59 from the clutch spring 60a, and (2) the switch 68a comes into registration with a notch 68c of the cam 68 (FIGURE 5) causing the switch to return to its unoperated position wherein it again energizes the drive trip solenoid 36 and disengages the clutch 32 to stop the advance of the head carriage 39. Operation of the drive trip solenoid 36 closes switch 36a and maintains the advance clutch solenoid operated via switch 68a in its unoperated position. Thus, at the end of the first one-quarter second after the machine has been shifted into record condition the advance clutch cams are latched in their one-quarter second position and the head carriage is at standstill in a one-quarter second advanced position with a one-quarter second erase interval having been put on the record.

It is to be noted further that when the machine is shifted to record condition the speed change solenoid 24 is energized from the D.C. power leads 47 and 52 through the switch $R_4$ causing the shaft 27 to be driven at a speed representing a rate of 12 pulses per second. Thus, the initial one-quarter second driven movement of the head carriage from home position is carried out at the accelerated speed.

The next operation of the user is to operate the standard telephone dial mechanism at the telephone set to dial the respective letters and digits of the selected telephone number to be recorded. Each letter or digit is represented by one or more pulses of which each pulse is represented by the dial pulse contacts 50 being held open for approximately 60 milliseconds. At the first opening of the dial pulse contacts 50 when a letter or digit is dialed, an erase signal is being fed to the magnetic head 40 because of the advance clutch cam 66 standing in a one-quarter second advance position. The instant the dial pulse contacts are opened the drive trip solenoid 36 is dropped out engaging the one-revolution clutch 32 and starting one revolution of movement of the gear 37 to step the carriage ahead by one unit at an accelerated speed. Also, the instant the dial pulse contacts are opened the circuit of the advance clutch solenoid 53 is opened dropping out the advance clutch solenoid and disengaging the rocker 57 from the notch 61a to cause the advance clutch mechanism to be returned home by the spring 62b. The return of the advance clutch mechanism to home position takes typically about 40 milliseconds. Since the feed of a record signal to the magnetic head is not started until the advance clutch mechanism is returned nearly home to return switch 66a to record position the magnetic head will define an erase track on the record for about one-half of the first step movement responsive to the first dial pulse thereby cutting short the first recorded pulse on the record. This reduction in the length of recorded signal band representing the first dial pulse has an advantageous effect when the pulses are reproduced as is later described.

Since each dial pulse is approximately 60 milliseconds long and since approximately 83 milliseconds are required to drive the shaft 27 through one full revolution the solenoid 36 will have become energized and will stand ready to disengage the clutch 32 momentarily at the end of each revolution. The instant the solenoid 36 is energized the advance clutch solenoid 53 is energized to start driving the advance clutch cams. If there is a succeeding dial pulse of a pulse train it arrives within about 40 milliseconds of the last prior pulse plus or minus the afore-described variations due to tolerances in the periodicity of the pulses. During such instant before the arrival of the next succeeding pulse the advance clutch cam 66 is not driven sufficiently from home position to operate the switch 66a to erase position. Accordingly, there is a continuous feed of record signal to the magnetic head 40 between the successive dial pulses of any one pulse train.

From the foregoing description it will be understood that whether the dial mechanism in the telephone set is fast or slow each pulse of a pulse train will produce one full revolution of movement of the shaft 27 to advance the head carriage within an interval of 83 milliseconds by a "unit" distance which is the distance which it would receive in 100 milliseconds of continuous driven movement were the shaft 27 driven precisely at a rate of 10 revolutions per second.

At the end of the last pulse of any one pulse train the drive trip solenoid 36 remains energized momentarily to continue holding the clutch 32 disengaged and the head carriage 39 therefore at standstill, and the advance clutch solenoid 53 stays energized to continue advancing the advance clutch cams. After 40 milliseconds of advance movement of the advance clutch cams, the cam 66 operates the switch 66*a* to feed erase signal to the magnetic head 40 and the cam 68 operates the switch 68*a* to drop out the drive trip solenoid 36 and restart the forward advance of the head carriage. The head carriage then continues its forward advance while an erase signal is fed to the magnetic head for a one-quarter second interval the same as when the R—R switch was first thrown into record position. At the end of this one-quarter second interval, the rocker 57 engages the notch 61*a* of the cam 61 to disengage the advance clutch 60 and to latch the cam in its one-quarter second advanced position, and the switch 68*a* is returned to unoperated position by its engagement with the notch 68*c* of the cam 68 to again energize the solenoid 36 and stop the forward drive of the head carriage.

When the user next dials another digit or letter of a telephone number the series of operations just described are repeated to advance the carriage by another step or steps while a record signal is being fed to the magnetic head 40 whereby to put on the record a substantially continuous signal band of a length dependent upon the letter or digit dialed. Again, at the end of the last dial pulse representing the respective digit or letter of the telephone number, the magnetic head will be advanced automatically for a one-quarter second interval while erase current is fed thereto. By these one-quarter second advances, interdigital spaces are placed on the record between successive digit-representing signal bands. At the end of each interdigital space the head carriage comes to standstill and the advance clutch becomes latched in its one-quarter second position. When the last letter or digit of the telephone number has been so recorded, the user will have to press a reset button 75 in order to restore the machine for further use either as a recorder or reproducer. The pressing of the reset button 75 tilts the rocker 57 out of the notch 61*a* and presses the roller 59 against the band clutch 60 to reengage the clutch and start further advance of the advance clutch cams. Once this further advance is started the rocker 57 becomes latched in its tilted position by its sliding engagement with the peripheral surface 61*b* of the cam 61 (FIGURE 2) and continues to hold the clutch 50 engaged after the reset button is released. The restarting of the advance clutch cams causes cam 68 to reoperate the switch 68*a* by the disengagement of the switch button from the notch 68*c* to drop out the drive trip solenoid 36 and thereby reengage the clutch 32 and restart the advance of the head carriage. The head carriage continues this forward advance operating as an eraser because the cam 66 continues to hold the switch 66*a* operated during this continued advance period. Although the switch 36*a* was dropped out when the solenoid 36 was deenergized the advance clutch solenoid 53 continues to be energized via the switch 68*a* in its operated position and lead 74 as shown in FIGURE 6.

When the head carriage has been so advanced a little less than one and three-quarters seconds—the time required to advance the cams 61 and 66–68 by about ⅞ turn less the amount of offset of the switch 67*a* from the home position of the lug 67*b* of cam 67 shown in FIGURE 4, the cam 67 opens the switch 67*a* to remove power from the reset solenoid 76 while the cam 68 continues to hold the switch 68*a* operated. The instant power is removed from the reset solenoid 76 the spring 81 returns the lever 78 and presses the trip rod 42 against the pawl 39*a* to disengage the carriage drive mechanism and cause the carriage to be snapped back to home position by the spring 44. If the carriage 39 had been driven to the end of its travel it would have opened the end switch 77 and then undergone the same snap back to home position for the same reason. The return of the head carriage to home position opens the mute switch 71 and prevents any feed of signal to the head 40 until the head carriage is again moved out of home position. Also, when the reset solenoid 76 is dropped out responsive to pressing the reset button 75, the spring 81 presses the bell crank lever 78 to the left against a pin 84*a* on a crossbar 84 pivotally supported at its right end by the upright arm of a bell crank lever 85 and pivotally supported at its left end by a lever 86. By this leftward shifting of the crossbar 84 the same is placed into a detented position determined by a detent mechanism 87, and the lever 86 is placed into a stop position wherein the free end thereof lies in the pathway of the lug 67*b* of the cam 67. As shown in FIGURE 4, the stop lever takes a position at ⅓ interval of advance of the lug 67*b* from home position. Since the reset solenoid 76 is not dropped out until the advance clutch cams have turned through nearly one full revolution to open the switch 67*a*, the lever 86 is shifted into its stop position after the lug 67*b* has been moved there beyond and serves to limit the return of the advance clutch cams to this position when the advance clutch 60 is disengaged. The advantage of limiting the return of the advance clutch cams to the ⅓ second position arises during a subsequent reproducing operation, as will appear.

Also, when the reset solenoid 76 is dropped out responsive to pressing the reset button 75, the latching pawl 89 for the R—R rocker 88 is released by means of the return spring 81 acting through the bell crank lever 78 and a link 82 interconnecting this lever and the latching pawl 89. Upon being so unlatched the R—R rocker 88 is returned to a neutral position by the biasing force exerted thereon by the R—R switches. This return of the R—R switches to neutral completes the telephone circuit via switch $R_3$ to assure the telephone is in a normal operable condition and it removes all power from the machine. Among other things, the power removal stops the drive motor 10 and drops out the advance clutch solenoid 53 to disengage the advance clutch 60 and allow the spring 62*b* to return the advance clutch cams to the ⅓ second position of advance just above-described.

Upon completion of the reset operation as above-described, the machine is in condition either for a subsequent record operation or a subsequent reproduce operation. If the user desires to record another telephone number he would next press the record button to shift the R—R switches into their number one position and then proceed ahead in the manner above-described. Upon so pressing the record button a depending finger 88*a* of the R—R rocker is moved against a horizontal arm of the bell crank lever 85 to shift the crossbar 84 into its rightward detented position and to thereby disengage the stop lever 86 from the lug 67*b* of the cam 67 and permit the full return of the advance clutch cams to their home position by the return spring 62*b*. In order that the reset solenoid 76 will be free to operate as soon as D.C. power is brought onto the lines 47 and 52 without limitation as to whether or not the pawl 89 has already engaged the catch 90 of the R—R rocker 88, a lost motion connection 83 is provided between the link 82 and the pawl 89.

If after completion of a reset operation the user decides that he wants next to reproduce a recorded telephone number to make a calling connection, he will first lift the receiver from the cradle and wait for dial tone, will shift the record medium to bring the desired track into engagement with the magnetic head 40 now standing at its home position, and will then press the reproduce button of the R—R rocker 88 until the rocker is latched by the pawl 89 engaging a notch 91 in the rocker. This shifting of the machine into reproduce condition allows the stop lever 86 to remain in its stop position wherein it continues to hold the advance clutch cams in a ⅓ second position of advance.

The shift of the R—R switches to reproduce position again energizes the reset solenoid 76 through the switch $R_1$ which brings power to the D.C. line 47–52. The energization of the reset solenoid allows the pawl 89 to engage the notch 91 and hold the R—R switches latched in reproduce position. Also, the energization of the reset solenoid 76 moves the trip rod 42 free of the feed pawl 39*a* to restore the carriage feed mechanism to operative condition. The drive motor 10 is now also started through the $R_1$ switch. The drive trip solenoid is now held permanently deenergized because the receiver is taken off the cradle when a call is to be made, causing the hook switch $H_2$ to open the circuit of the solenoid 36. Since the clutch 32 is therefore permanently engaged the head carriage is now driven forwardly in a continuous manner. This drive of the carriage is, however, at normal speed because the switch $R_4$ now holds open the circuit of the speed change solenoid 24 causing the shaft 27 to be therefore driven through the clutch 28 from the shaft 14 at a precise speed of 10 revolutions per second.

Also, during a reproduce operation the telephone receiver $T_r$ is muted by a circuit 92 completed through the switch $R_2$. The switch $R_3$ is now open to force completion of the telephone circuit via the machine pulsing contacts. The switch $R_4$ has now not only disabled the speed change solenoid 24 as beforementioned but now connects also the plus power lead 47 to a lead 93 to complete a circuit for the advance clutch solenoid 53 across the D.C. power line 47–52 through the switch 20*a* of the dial clutch solenoid 20. The switch R5 connects the dial clutch solenoid 20 from the negative lead 52 to the output of the amplifier 72 whereby upon a signal being picked up from the record medium and fed through the amplifier the solenoid will be energized. The switch $R_6$ now completes connection of the plus lead 47 through the magnetic head 40 to the input of the amplifier 72 to place the audio system of the machine into reproduce condition. The switch $R_7$ holds open the output circuit of the oscillator 70.

As the magnetic head scans a track on the record bearing signal bands respresenting the successive letters and digits of a telephone number, the dial clutch solenoid 20 is held activated for the duration of the scanning of each signal band. As before-described, the length of signal band recorded on the record is approximately a one-half "unit" for digit "1," one and one-half unit for digit "2," etc., where a "unit" is the length which would be recorded in 100 milliseconds were the shaft 30 driven at 10 revolutions per second. The instant the clutch solenoid 20 is activated it releases the dog 19 to start rotation of the dial pulsing cam 17 at a precise speed of 10 revolutions per second. This cam has a lobe to hold the pulsing switch 18 open for 60 milliseconds of each revolution. When the recorded band is approximately only 50 milliseconds long to represent a single dial pulse, the solenoid 20 is permitted to drop out while the dog 19 is in intermediate position and to be ready to stop the dog when it has completed a single revolution. When the recorded band is longer by an integral number of "unit" lengths it allows a correspondingly larger number of dial pulses to be generated. During each scanning of a signal band the dial clutch solenoid 20 holds open the switch 20*a* to deenergize the advance clutch solenoid 53.

As the magnetic head 40 scans the one-quarter second interdigital spaces between successive signal bands no signal is picked up from the record with the result that the dial clutch solenoid 20 is not operated and the clutch 15 is disengaged; however, the switch 20*a* is closed and the advance clutch solenoid 53 is operated to engage the advance clutch 60. The advance clutch cams are therefore advanced during the one-quarter second interdigital intervals from their one-third second start positions. This one-quarter second advance of the advance clutch cams from the one-third second start position has no control effect on the machine and when the scanning of an interdigital space is completed the pickup of signals from the next succeeding signal band again operates the dial clutch solenoid 20, opens the switch 20*a* to drop out the advance clutch solenoid 53 which in turn disengages the clutch 60 and allows the advance clutch cams to snap back to their one-third second start positions.

As before described there is provided on the record following the last recorded signal band of a recorded telephone number an unrecorded end space of approximately two seconds duration as a result of the one-quarter second interdigital space which follows automatically after each recorded signal band and the additional approximate one and three-quarter seconds unrecorded space which follows as a result of the reset operation. When the magnetic head 40 scans this end space it starts driving the advance clutch cams from their one-third second advanced positions with the result that within about one and two-thirds seconds—i.e., one-third second before the full end space is scanned—the cam 67 opens the switch 67*a* to restore the magnetic head to its initial position, return the advance clutch cams to their one-third second positions, and cut off all power to the machine to place the machine in the same condition as it has at the end of a reset operation. The machine is then ready again for another reproduce operation or for another record operation by the user pressing the reproduce or record buttons and proceeding in the manner hereinbefore described.

The embodiment of my invention herein particularly shown and described to illustrate the invention is subject to changes and modifications without departure from the scope of my invention, which I endeavor to express according to the following claims. In the claims the phrase "pulses in a given train" is intended to mean one or more successive pulses representing the letters and digits of respective telephone numbers.

I claim:

1. Apparatus for recording a substantially continuous signal for a time duration dependent upon the number of input pulses in a given train notwithstanding variation in the periodicity of the input pulses, comprising a record medium, a cooperating translating head, drive means including means successively activatable to produce successive respective step movements each by a given distance between said head and record medium along a given track on the latter, means responsive to each of said input pulses for producing a respective single activation of said drive means, and means responsive to said input pulses for feeding a signal continuously to said head for a predetermined interval depending upon the number and periodicity of the input pulses in said train.

2. The apparatus set forth in claim 1 wherein said variations in the periodicity of said input pulses are within a given percentage plus and minus of a mean frequency, and wherein said drive means is responsive to each activation thereof to produce a respective step movement within a time interval at least less than the time elapsing between successive input pulses when the input pulses are at their highest frequency.

3. The apparatus set forth in claim 2 including conditioning means shiftable to connect said head to operate as a reproducer, and means responsive to said conditioning means for causing said drive means to produce a continuous progressive movement between said head and record medium at a speed bearing a ratio to the speed of each step movement which is at most equal to the ratio of said mean frequency to said highest frequency of said input pulses.

4. The apparatus set forth in claim 3 wherein the speed of said continuous progressive movement between said head and record medium is equal at least to .704 and at most to .91 of the speed of each of said step movements.

5. The apparatus set forth in claim 3 wherein the continuous progressive movement between said head and record medium is at a speed which is equal approximately to .83 of the speed of each step movement.

6. In an automatic repertory dialing machine: the combination of a drive motor having a drive shaft; a dial pulsing switch; a rotary cam for operating said switch; a second drive shaft; a one-revolution clutch between said second shaft and dial pulsing cam; permanent gearing between said motor shaft and second shaft for driving the latter at a precise speed adapted to operate said dial pulsing switch at a prescribed periodicity when said one-revolution clutch is engaged; a third drive shaft in axial alignment with said second drive shaft; a drive coupling between said motor and said third shaft comprising a normally disengaged speed-change clutch and gearing for overdriving the third shaft at a speed faster than that of said second shaft when said speed-change clutch is engaged; a one-way clutch between said second and third shafts permitting said overdriving of the latter when said speed-change clutch is engaged and causing the latter to be driven by said second shaft when said speed-change clutch is disengaged; a dial-number recording and reproducing mechanism including a head carriage movable relative to a record medium, drive means operable by said third shaft for advancing said head carriage and shiftable means for conditioning the mechanism selectively for recording and reproducing; and means controlled by said conditioning means for engaging said speed-change clutch when said dial-number machine is conditioned for recording and for disengaging said speed-change clutch when said dial-number mechanism is conditioned for reproducing.

7. The dialing machine set forth in claim 6 including a telephone dialing mechanism for producing series of dial pulses in predetermined relation to letters and digits dialed, a one-revolution drive clutch between said third shaft and said drive means for said head carriage, and means rendered operable by said conditioning means when said machine is conditioned for recording for controlling said one-revolution drive clutch respectively by the dial pulses from said telephone dial mechanism.

8. The dialing machine set forth in claim 6 including a drive clutch between said third shaft and said drive means for said head carriage, and means responsive to said conditioning means for holding said drive clutch continuously engaged while said dial-number mechanism is conditioned for reproducing.

9. In an automatic repertory dialing machine wherein dial pulse trains from telephone dial mechanisms are recorded as spaced signal bands and wherein during reproducing said respective signal bands are converted to dial pulses: the combination of a transducer; drive means for moving said transducer relative to a record medium; means for selectively shifting said machine into record and reproduce conditions and into a condition for a reset operation; a timing mechanism for said machine including a timing member biased into a home position, a clutch for coupling said timing member to said drive means, and means controlled by input pulses during recording and by signals picked up during reproducing to cause said clutch to be engaged only during absence of said signals; a first stopping switch for said machine prepared for operation by shifting said machine into record condition and positioned at a first predetermined distance in the path of said timing member from home position for operation by the timing member when the same has traversed said first predetermined distance; a second stopping switch for said machine positioned at a second predetermined distance in the path of said timing member from home position for operation thereby upon the timing member having traversed said second predetermined distance; means responsive to shifting said machine into reset condition for advancing said timing member to said second switch and concurrently advancing said transducer relative to the record medium; and means responsive to operation of said second switch for placing a stop member in the path of said timing member to limit the return of the timing member to a predetermined intermediate position.

10. The combination set forth in claim 9 including means responsive to shifting said machine into record condition for removing said stop member from the path of said timing member and permitting full return of the timing member to home position.

11. The combination set forth in claim 9 wherein said second switch is operable to stop said machine when the machine is in reproduce condition, including means for maintaining said stop member in effective position while the machine is in reproduce condition whereby the time duration of absence of signal picked up from the record medium to cause said second switch to be operated to stop the machine when the machine is in reproduce condition is substantially less than the time required for said timing member to traverse the distance from home position to said second switch.

12. The combination set forth in claim 11 wherein said stop member is positioned in the path of said timing member at an intermediate position between said first and said second switches.

13. The combination set forth in claim 9 wherein said clutch is of a band type comprising a coil spring and a pressure roller operable against said spring to engage said clutch, a rocker carrying said pressure roller at one end, a clutch solenoid carrying said rocker pivotally at its central portion, a rotary cam driven via said clutch and engaging said rocker at the other end whereby upon energization of said solenoid said rocker is tilted to move said pressure roller against said clutch spring to engage said clutch, and a notch in said cam engageable by said rocker when the cam has been rotated through a predetermined distance to disengage said clutch and latch said cam while said solenoid remains energized.

14. Apparatus for recording a substantially continuous signal for a time duration dependent upon the number of input pulses in a given train notwithstanding variations in the periodicity of the input pulses, comprising a record medium, a cooperating translating head, drive means including means successively activatable to produce respective step movements between said head and record medium each of a given distance and over a timed interval less than the time elapsing between successive input pulses when the input pulses are at their highest frequency, means responsive to each of said input pulses for producing a respective single activation of said drive means, and means responsive to said input pulses for feeding a signal continuously to said head for a period running from an instant during the first of said input pulses to the end of the last of the input pulses in said train.

15. In an automatic repertory dialing machine: the combination of a record medium, a cooperating translating head, drive means successively activatable to produce successive step movements between said head and record medium, a dialing mechanism for producing trains of dial pulses of numbers according to the respective digits dialed, means responsive to said dialing mechanism for activating said drive means by different numbers of activations according to the number of individual dial pulses representing the respective digits dialed, and means responsive to said dial pulses for feeding a signal continuously to said head for recordation on said record medium.

16. In an automatic repertory dialing machine: the combination of a dialing mechanism for producing trains of dial pulses of numbers according to the respective digits dialed, a record-reproduce mechanism including a head operable as a recorder or reproducer, a record medium, and drive means for producing a movement between said head and record medium, means for conditioning said record-reproduce mechanism to operate as a recorder with said drive means being activated responsive to each pulse from said dial mechanism to produce a step movement of a given distance between said head and record medium within a time interval less than the normal time period from one dial pulse to the next, including means for feeding a signal continuously to said head starting with the first dial pulse and ending with the last dial pulse of each train whereby an overall length of signal band is recorded on said record medium depending on the digit dialed, and means for conditioning said record-reproduce mechanism to operate as a reproducer with said drive means conditioned to produce a continuous movement between said head and record medium at a speed to traverse each distance of said step movement in said normal time.

References Cited by the Examiner

UNITED STATES PATENTS

| | | | |
|---|---|---|---|
| 2,435,879 | 2/48 | Eilenberger | 179—100.2 |
| 2,767,243 | 10/56 | Steeneck | 179—100.2 X |
| 2,885,658 | 5/59 | Marcellus | 346—74 X |
| 2,916,727 | 12/59 | Jones | 178—6.6 |
| 2,921,142 | 1/60 | Tinus | 179—90 |
| 2,972,735 | 2/61 | Fuller | 346—74 X |
| 3,025,124 | 3/62 | Evans | 346—74 X |
| 3,040,133 | 6/62 | Kobler et al. | 179—90 |

FOREIGN PATENTS

| | | |
|---|---|---|
| 860,794 | 2/61 | Great Britain. |

ROBERT H. ROSE, *Primary Examiner.*